US011513180B1

(12) United States Patent
Gagliano et al.

(10) Patent No.: US 11,513,180 B1
(45) Date of Patent: Nov. 29, 2022

(54) TRACKING BEACON SYSTEM

(71) Applicant: LMD Applied Science, LLC, Rochester, NY (US)

(72) Inventors: Christopher A. Gagliano, Rochester, NY (US); Susan N. Houde-Walter, Rochester, NY (US); Brian L. Olmsted, Rochester, NY (US)

(73) Assignee: LMD Applied Science, LLC, Rochester, NY (US)

( * ) Notice: Subject to any disclaimer, the term of this patent is extended or adjusted under 35 U.S.C. 154(b) by 247 days.

(21) Appl. No.: 16/555,908

(22) Filed: Aug. 29, 2019

Related U.S. Application Data

(60) Provisional application No. 62/725,800, filed on Aug. 31, 2018.

(51) Int. Cl.
*H04B 10/00* (2013.01)
*G01S 1/70* (2006.01)

(52) U.S. Cl.
CPC .......... *G01S 1/7038* (2019.08); *G01S 1/7034* (2019.08)

(58) Field of Classification Search
CPC ............ H04B 10/1143; H04B 10/1149; H04B 10/116; H04B 10/803; H04B 10/11; H04B 10/40; H04B 10/1123; H04B 1/38; H04B 10/2589; H04B 10/1125; H04B 10/1127; H04B 1/3805; H04B 1/3833; H04B 1/385; H04B 10/43; G08C 23/00; G08C 17/02; G08C 2201/21; G08C 2201/32; G08C 2201/92; H04L 61/2076; H04L 61/6022; H04L 67/125; H04W 60/04; F41G 1/345; F41G 1/35
USPC ....... 398/118, 128, 130, 123, 135, 137, 158, 398/162, 172, 195, 189
See application file for complete search history.

(56) References Cited

U.S. PATENT DOCUMENTS

| | | | | |
|---|---|---|---|---|
| 2008/0232813 | A1* | 9/2008 | Yutani | H04B 10/2537 398/135 |
| 2011/0272580 | A1* | 11/2011 | Houde-Walter | F41G 1/35 250/341.8 |
| 2016/0238535 | A1* | 8/2016 | Day | G01J 3/443 |
| 2016/0370145 | A1* | 12/2016 | Houde-Walter | G01J 5/0896 |

* cited by examiner

Primary Examiner — Hibret A Woldekidan
(74) Attorney, Agent, or Firm — Lee & Hayes, P.C.

(57) ABSTRACT

An example tracking signal device comprises a housing and a light source disposed within the housing. A window is defined within the housing optically downstream of the light source. The device further comprises a sensor configured to receive a first beam of radiation and a controller operably coupled to (i) the light source and (ii) the sensor. The controller is configured to control the light source to emit a second beam of radiation based at least in part on receipt of the first beam of radiation by the sensor.

16 Claims, 4 Drawing Sheets

TRACKING BEACON SYSTEM

CROSS-REFERENCE TO RELATED APPLICATIONS

This nonprovisional patent application claims the benefit of U.S. Provisional Application No. 62/725,800, filed Aug. 31, 2018, the entire disclosure of which is incorporated herein by reference.

BACKGROUND

1. Field of the Invention

The present invention relates to beacon systems, and more particularly to tracking beacon systems usable to track persons and apparatuses in covert operations.

2. Description of Related Art

Tracking beacons for use by special operations forces (SOF) in covert operations may be used by placing such tracking beacons on persons or apparatuses to be tracked. Such tracking beacons can emit a tracking signal that a party is able to track, e.g., a tracking signal in the form of a radiation beam. In order to help avoid detection of the tracking signal by other parties, e.g., the person or apparatus being tracked, the tracking signal may be in the form of a laser in the mid-wave IR wavelength band or the shortwave IR wavelength band. This helps keep the radiation from being visible to the naked eye or to persons wearing night vision goggles.

In order to help prevent the tracking signal from being discovered, the tracking signal device emitting the tracking signal needs to be small and also needs to "blend in" with the environment. Thus, the tracking signal device may be placed on the person or apparatus to be tracked prior to activation. Accordingly, the tracking signal needs to be capable of being activated remotely while remaining undetected. This can involve the tracking signal device needing to be activated by an entity from far away.

SUMMARY

In configurations, a device comprises a housing and a light source disposed within the housing. A window is defined within the housing optically downstream of the light source. The device further comprises a sensor configured to receive a first beam of radiation and a controller operably coupled to (i) the light source and (ii) the sensor. The controller is configured to control the light source to emit a second beam of radiation based at least in part on receipt of the first beam of radiation by the sensor.

In configurations, a system comprises a first device that comprises a housing and a light source disposed within the housing. A window is defined within the housing optically downstream of the light source. The device further comprises a sensor configured to receive a first beam of radiation and a controller operably coupled to (i) the light source and (ii) the sensor. The controller is configured to control the light source to emit a second beam of radiation based at least in part on receipt of the first beam of radiation by the sensor. The system further comprises a second device that comprises a second housing and a second light source within the second housing that is configured to emit the first beam of radiation. The second device further comprises a mounting component configured to attach the second light source to an apparatus external to the second housing.

In configurations, a method comprises receiving, at a sensor of a device, a first beam of radiation. The method further comprises, based at least in part on the first beam of radiation, providing, by a controller of the device operably coupled to (i) a light source of the device and (ii) the sensor, a signal to the light source. The method also comprises, based at least in part on the signal, emitting, by the light source, a second beam of radiation based at least in part on receipt of the first beam of radiation by the sensor.

DETAILED DESCRIPTION OF THE DRAWINGS

Figure 1A:
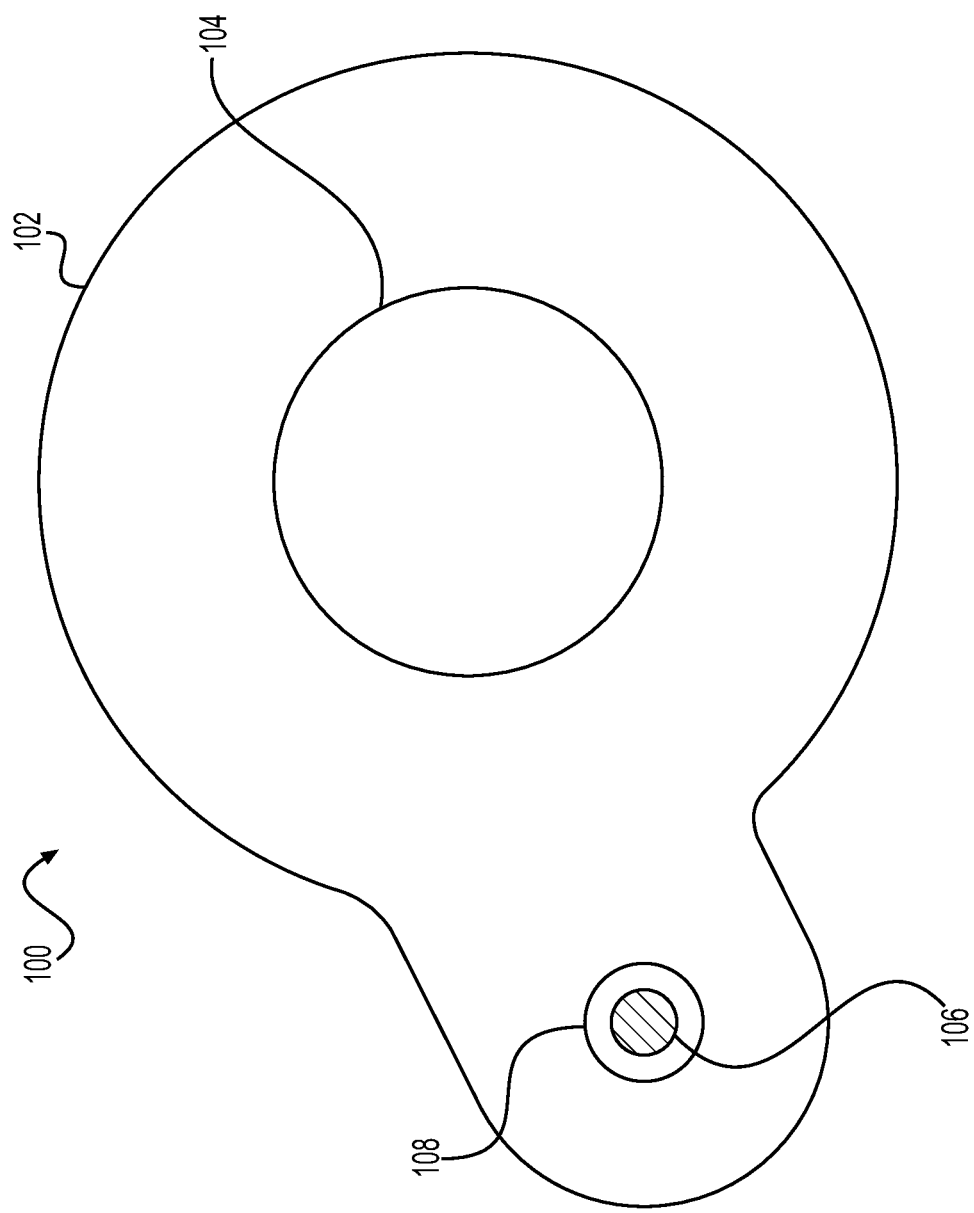
FIG. 1A is a schematic top view of a tracking signal device, in accordance with various configurations.

Unless stated otherwise herein, the drawings are not necessarily to scale. FIG. 1A is a schematic top view of a tracking signal device 100. The tracking signal device 100 includes a housing 102. The housing 102 includes a first window or lens 104 defined therein. The first window 104 is configured to emit radiation beams. For example, the radiation beams emitted may be a laser beam in the mid-wave IR wavelength band or the shortwave IR wavelength band. Other forms of radiation may be emitted through the window 104 in other wavelength bands if desired or needed. For example, the radiation beam may be a form of ultraviolet (UV) radiation, e.g., near IR, shortwave IR, long-wave IR, or some other band. In some configurations, the window 104 is in the form of a divergent lens that may be configured to direct or divert, e.g., diffuse, radiation beams therethrough. In other configurations, the window 104 is in the form of a substantially clear or colored window having no other optical properties and may be flat or dome shaped.

The tracking signal device 100 further includes a sensor 106. The sensor 106 may receive a radiation beam that may activate the tracking signal device 100, as will be described further herein. For example, the sensor 106 may receive a radiation beam in the mid-wave IR wavelength band, the shortwave IR wavelength band, or other band. The sensor 106 may be located below a second window 108 through which the received radiation beam may pass. In configurations, a filter (not illustrated) may be included between the sensor 106 and the second window 108 to filter wavelengths other than the wavelength of the trigger beam. While the shape of the tracking signal device 100 illustrated in FIG. 1 is substantially circular (except for the portion that includes the sensor 106, thus providing an overall teardrop shape), other shapes may be used for the tracking signal device 100 as desired or needed.

Figure 1B:
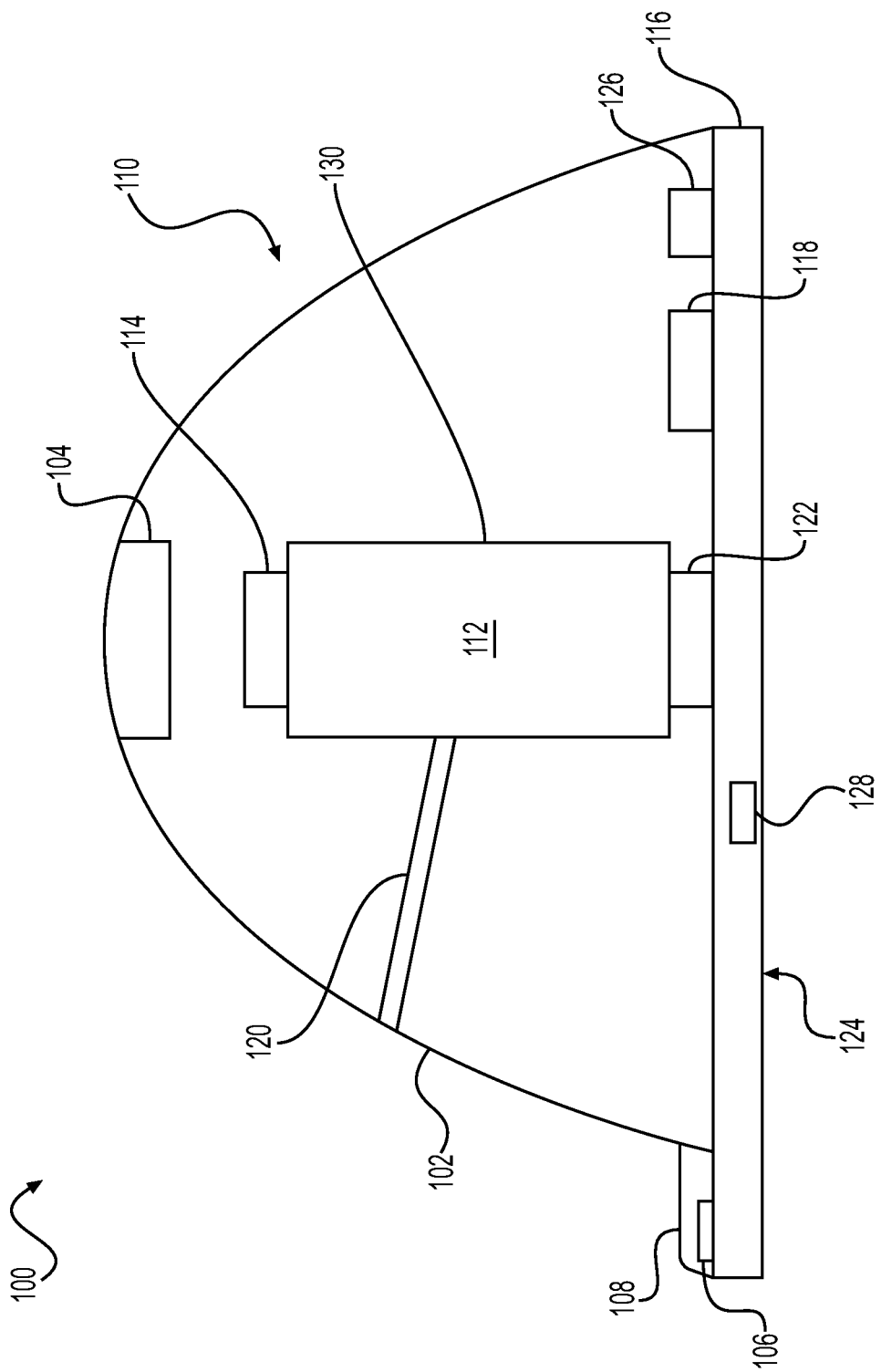
FIG. 1B is a schematic side view of the tracking signal device of FIG. 1, in accordance with various configurations.

FIG. 1B is a schematic side view of the tracking signal device 100. As can be seen in FIG. 1B, a portion 110 of the housing 102 that corresponds to the substantially circular shape illustrated in FIG. 1A is substantially dome-shaped. However, other shapes may be used for the housing 102 as desired. For example, the housing 102 may comprise a shape such that the tracking signal device 100 blends in with the environment, e.g., surroundings, in which the tracking signal device 100 is being used. In configurations, the housing 102 comprises a heat-conducting material to allow for thermal dissipation of heat from the tracking signal device 100 therethrough.

The tracking signal device 100 further includes a light source 112. The tracking signal device 100 may further include, in configurations, an optical system 114 between the first window 104 and the light source 112. The light source 112 may be directly coupled or mounted on a printed circuit board (PCB) 116 of the tracking signal device 100. Thus, one or more processors 118, e.g., System on Chips (SoCs), may be included on the PCB 116 that may serve as a controller to control the tracking signal device 100. As is known, the PCB 116 may include other components not specifically illustrated in FIG. 1B or mentioned herein.

The optical system 114 may comprise one or more windows, lens, prisms, etc. The optical system 114 is configured to help direct and/or divert light emitted by the light source 112 through the first window 104. In particular, in configurations, the optical system 114 may comprise an engineered diffuser. The engineered diffuser is configured to help direct, divert and/or spread the light out through the window. The engineered diffuser may be designed using software. The software may help a user to design the engineered diffuser to direct, divert, and/or diffuse the light emitted by the light source as desired. In configurations, the optical system 114 may not be included in the tracking signal device 100. In such configurations, the first window 104 may be in the form of a divergent lens that may be configured to direct or divert, e.g., diffuse, radiation beams therethrough. Additionally, in such configurations, the first window 104 may be in the form of other optics similar to the non-included optics system 114, including an engineered diffuser or diffractive optic.

In configurations, one or more metal connectors 120 may be connected between the body of the light source 112 and the housing 102. Such metal connectors 120 may help direct and/or diffuse heat through the housing 102 from the tracking signal device 100 and/or the light source 112.

In configurations, the light source 112 comprises, for example, a quantum cascade laser (QCL) or semiconductor laser in a hermetically sealed TO can. Other types of laser devices may be used as the light source 112 if desired or needed. While the configurations being described herein include using a laser light source, a non-lasing light source may be used if desired or needed. For example, a light source that emits radiation beams in the ultraviolet (UV) bandwidth may be used if desired or needed.

In configurations, the tracking signal device 100 may include a heat dissipating gel within the housing 102 to help direct and/or diffuse heat from the tracking signal device 100 and/or the light source 112 through the housing. In configurations, the light source 112 emits a radiation beam having a wavelength greater than one micron. In particular, in configurations, the radiation beam emitted by the light source 112 has a wavelength in a range of three to five microns.

For example, in configurations where the light source 112 comprises a QCL, the light source 112 may emit long-wave IR radiation beams, mid-wave IR radiation beams and/or shortwave IR radiation beams through the first window 104 and/or the optical system 112 to emit the radiation beams in a desired beam distribution. Example beam distributions may include a collimated beam, a semi-directional cone, a ring or fan-shaped beam, and/or an omni-directional distribution. In some configurations, the emitted radiation beams may be visible with standard IR imagers at ranges between 5-46 km. In some examples, size, weight and power (SWaP) may be reduced by using custom optics and minimizing the number of components.

In configurations, the light source 112 may be mounted to the PCB 116 on a metal support 122. Such a metal support 122 allows for the light source 112 to stand off from the PCB 116, which may aid in heat dissipation. In other configurations, the light source 112 is mounted directly on the PCB 116.

The sensor 106 is operationally coupled to the one or more processors 118. The sensor 106 is configured to receive a trigger beam, e.g., a radiation beam, through the second window 108, as will be described further herein. The sensor 106 may be located, as may be seen in FIGS. 1A and 1B, external to the overall housing 102 under the second window 108. However, in configurations, the sensor 106 may be located under the first window 104 defined within the housing 102. Thus, the sensor 106 may be located adjacent to the light source 112 in the housing 102. The sensor 106 may comprise a semiconductor-based light detecting sensor, e.g., a photodiode, a photovoltaic device, a photoconductive device, etc. The sensor 106 may be positioned under the first window 104 or the second window 108 such that it may receive radiation beams in a wide range of angles. Likewise, the light source 112 may be positioned under the first window 104 such that it can transmit radiation beams from the light source 112 in a wide range of angles. In configurations where the sensor 106 and the light source 112 are located under the same window, e.g., first window 104, the sensor 106 may also receive the trigger beam through the optical system 112, if such an optical system 112 is included in the tracking beam device 100.

When the sensor 106 receives a radiation beam or trigger beam, the sensor 106 provides a signal to the one or more processors 118. The one or more processors 118 may then generate a control signal and provide the control signal to the light source 112 to cause the light source 112 to emit a radiation beam. In other words, when the sensor 106 receives the trigger beam, the tracking signal device 100 "wakes up" and is activated, e.g., turned on. The tracking signal device 100 will then begin to emit a radiation beam via the light source 112. The emitted radiation beam may be encoded using a particular wavelength, a particular pulse or pattern of emission, a color of emission, a length of time of emission, etc. In configurations, the trigger beam and the radiation beam emitted by the light source 112 may have the same wavelength.

In configurations, the trigger beam may be an encoded beam that may activate the tracking beam device 100 to operate in one of a plurality of modes of operation, may change the mode of operation of the tracking beam device 100 to a different one of the plurality of modes of operation. For example, if the trigger beam has a first wavelength detected by the sensor 106, then the control signal generated by the one or more processors 118 may cause the light source 112 to emit in radiation beams in a first mode, e.g., a single, continuous radiation beam. However, if the received trigger beam has a second wavelength, then the one or more processors 118 may generate a second control signal to cause the light source 112 to emit radiation beams in a second mode, e.g., a flashing pattern of radiation beam emission. A trigger beam received by the sensor having a third wavelength may cause the one or more processors 118 to generate a control signal to cause the light source 112 to emit radiation beams in a predetermined pattern. Likewise, another mode of operation may include the light source emitting a single radiation beam, e.g., single flash of light.

Additionally, the trigger beam 204 may be emitted at different pulse codes in order to activate the tracking signal or change the mode of operation of the tracking signal device 100.

In configurations, a bottom surface 124 of the PCB 116 may serve as an external surface for the tracking signal device 100. In configurations, the PCB 116 may be coupled to a separate substrate (not illustrated) that serves as the external surface for the tracking signal device 100. Thus, the housing 102 is coupled to either the PCB 116 (or the substrate). The housing 102 is generally sealed to the PCB 116 such that the tracking signal device 100 is protected against the elements, e.g., dust, moisture, etc. The sensor 106 may be located within the housing 102 adjacent to the light source 112, as previously described, or may be located external to the housing 102 under the second window 108. In either configuration, the sensor 106 may be operationally coupled to the one or more processors 118 via the PCB 116. Thus, the sensor 106 may be located directly coupled to the PCB 116 or may be located on a separate support (not illustrated) that is coupled to the PCB 116.

In configurations, one or both of the windows 104, 108 may comprise a plastic, e.g., silicon, germanium, sapphire, etc. The housing 102 may comprise metal, plastic, or other material that blends in with the environment and surroundings in which the tracking signal device 100 is being used. The shape and size of the tracking signal device 100 may be such that the tracking signal device 100 may be as inconspicuous as possible, e.g., the tracking signal device 100 may be configured to blend in with the environment and surroundings in which it is being used, to allow for the tracking signal device 100 to be used in covert operations. In configurations, the tracking signal device 100 may be roughly the size of a U.S. quarter coin, a U.S. 50 cent coin, a U.S. silver dollar coin, etc.

In configurations where the light source 112 comprises a QCL, a fully hermetically-sealed housing 130 may encapsulate the QCL in an air-tight but optically-clear environment. In some configurations, metal seals may be used. In such configurations, epoxies or other off-gassing materials may be omitted from the housing 130 and/or design of the QCL. The housing 130 may also contain components (e.g., active or passive heat sinks, phase-change materials, etc.) configured to remove Joule heat for improved QCL performance and to protect the QCL from mechanical impacts. In some configurations, the QCL may be designed to optimize range of use in a humid maritime/littoral environment. QCL crystals for a light source 112 comprising a QCL may be specifically chosen to minimize atmospheric absorption and maximize receiver reception. The housing 102 and/or tracking signal device 100 may be configured for use in fresh or saltwater.

In configurations, the tracking signal device 100 includes one or more batteries 126 to provide power for the tracking signal device 100. In configurations, the tracking signal device 100 may include a port 128 that may be configured to receive power from an apparatus to which the tracking signal device 100 is attached.

In particular configurations, the tracking signal device 100 may be powered by one or more CR123 batteries and may be activated at installation in a persistent mode. In such a persistent mode, the tracking signal device 100 may continually signal (e.g., may continuously emit a radiation beam at a desired wavelength) to SOF IR imagers, as is appropriate for extraction. Alternatively, the tracking signal device 100 may be set to "quiescent mode" in which the tracking signal device 100 does not emit a beam of radiation until it receives a covert optical probe, e.g., a trigger beam as previously described. In response to the trigger beam, the tracking signal device 100 may emit a covert optical "ping" (e.g., an encoded beam of IR radiation) to indicate positive identification.

The tracking signal device 100 may be attached to an apparatus using, for example, adhesives, magnets, tiedowns, etc. For example, the tracking signal device 100 may be attached to a motor vehicle, a ship, an aircraft, etc. The tracking signal device 100 may also be coupled to a person. Thus, tracking signal device 100 may be powered by one or more batteries, mains power, a power supply of the maritime machine (e.g., boat) on which it is being used, a power supply of a motor vehicle on which it is being used, a power supply of an aircraft on which it is being used, or other power sources.

Figure 2:
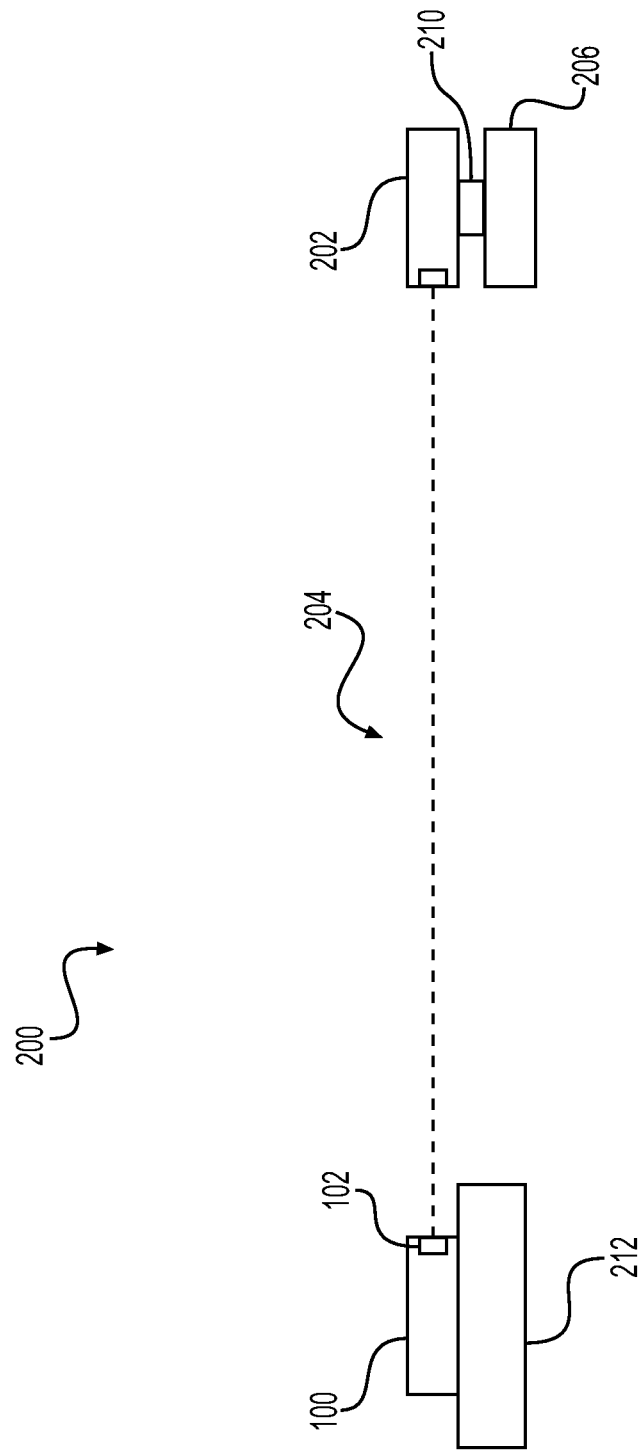
FIG. 2 is a schematic view of a system utilizing the tracking signal device of FIGS. 1A and 1B.

FIG. 2 illustrates an example arrangement of a system 200 wherein a tracking signal device 100 is activated by a trigger device 202 that emits radiation beams, e.g., a trigger beam 204. In configurations, the trigger device 202 may be removably or fixedly attached to an apparatus 206, e.g., a firearm. In configurations, the trigger beam 204 is emitted by the trigger device 202 as a columnated radiation beam. The trigger device 202 may include a light source 208 that emits the trigger beam 204 in the form of, for example, a laser beam, which may be received by the sensor 106 as previously described. The tracking signal device 100 may be located on an entity 210 such as, for example, a motor vehicle, a boat, an aircraft, etc.

In configurations, the trigger beam 204 may have a bandwidth of mid-wave IR or shortwave IR. In configurations, the trigger beam 204 may have other bandwidths. Thus, the light source 208 may be in the form of a quantum cascade laser or a TO can laser. However, other types of light sources may be used as desired or needed.

In configurations, the trigger beam 204 may have the same wavelength as the radiation beam emitted by the light source 112 of the tracking signal device 100. Thus, the trigger beam 204 generally has a bandwidth greater than one micron and in configurations, has a bandwidth in a range of three to five microns.

As previously noted, in configurations, the trigger beam 204 may be encoded. For example, a trigger beam 204 having a particular, for example, bandwidth, wavelength, pulse rate, intensity, etc., may activate the tracking signal device 100 in a particular mode of operation. Additionally, the trigger beam 204 may be emitted at different pulse codes in order to activate the tracking signal or change the mode of operation of the tracking signal device 100.

Figure 3:
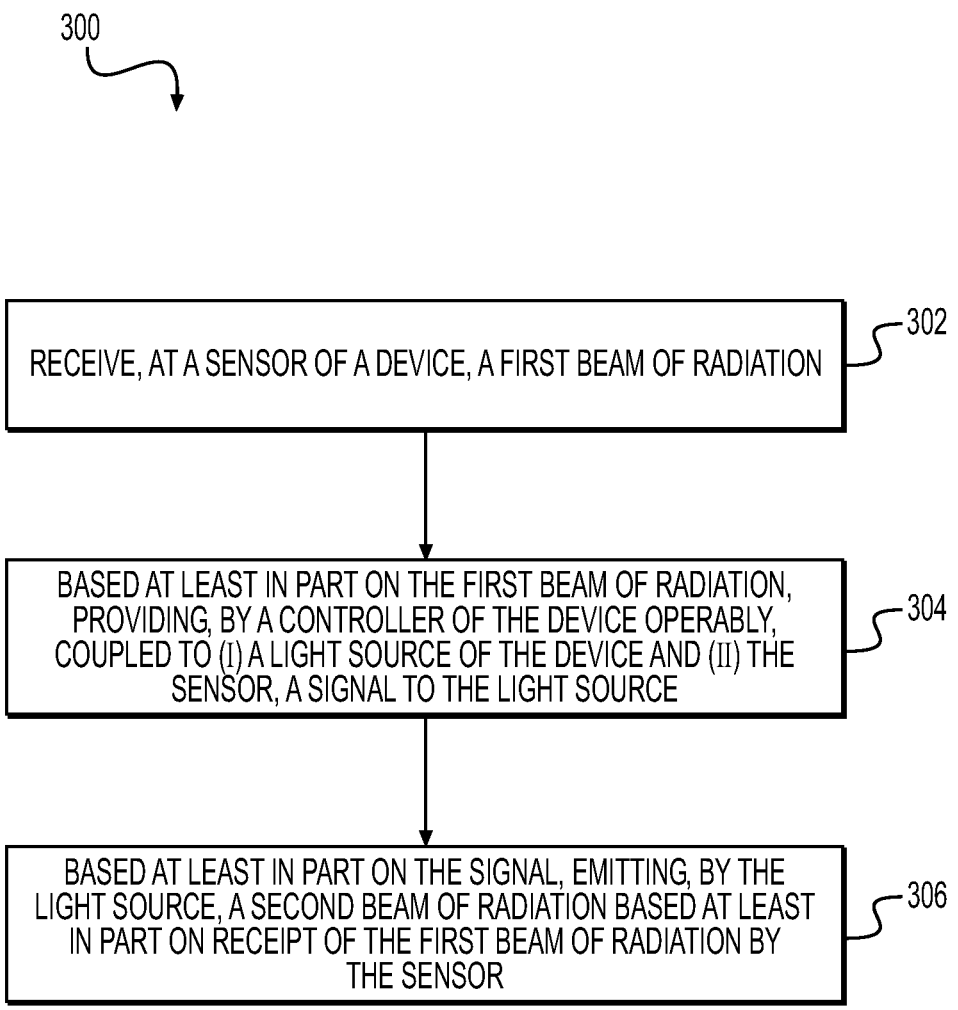
FIG. 3 is a flow diagram illustrating an example process of activating the tracking signal device of FIGS. 1A and 1B.

FIG. 3 is a flow diagram illustrating an example process 300 of activating the tracking signal device of FIGS. 1A and 1B. At block 302, a first beam of radiation is received at a sensor of a device. For example, the sensor 106 of tracking signal device 100 may receive a trigger beam 204 from a trigger device 202.

At block 304, based at least in part on the first beam of radiation, a controller of the device operably coupled to (i) a light source of the device and (ii) the sensor, provides a signal to the light source. For example, the one or more processors 118 of the tracking signal device 100 may generate, in response to the received trigger beam 204, a control signal that is provided to the light source 112.

At block 306, based at least in part on the signal, the light source emits a second beam of radiation based at least in part on receipt of the first beam of radiation by the sensor. For example, the light source 112 may receive the control signal from the one or more processors 118 and in response thereto, emit a radiation beam, thereby causing the tracking signal device 100 to emit the radiation beam in response to receipt of the trigger beam by the sensor 106.

Thus, in configurations the tracking signal device 100 comprises a small and rugged, lightweight, concealable, out-of-band tag for surreptitiously mounting on objects or wearing by personnel. The tag can be run in a persistent mode for continuous monitoring (e.g., when worn by personnel for extraction). Alternatively, it can be run in a quiescent mode, and activated with a covert optical probe (e.g., a radiation beam that may be encoded with a unique pulse rate or other unique characteristic such as, for example, a unique wavelength), to respond with an identifying but covert optical response, e.g. another radiation beam. Example tracking signal devices 100 in accordance with configurations described herein may thus provide a ruggedized, maritime beacon for SOF operations with extended ranges for U.S. forces, while minimizing counter-detection by adversaries.

To avoid detection by proliferated night vision goggles and commercially available or foreign uncooled thermal imagers which operate in the longwave IR band, example tracking signal devices 100 in accordance with configurations described herein may emit radiation in the mid-wave IR band and/or shortwave IR band. In some configurations, a tracking signal device 100 of the present disclosure may emit radiation in the mid-wave IR band only. In example configurations, the tracking signal devices 100 may comprise out-of-band beacons that support SOF maritime operations at operationally relevant ranges while remaining covert.

In recent years, warfighter platforms have steadily been equipped with mid-wave IR imaging capability. U.S. warfighters can "see" in the mid-wave IR. Example tracking signal devices 100 in accordance with configurations described herein may be configured to signal in the mid-wave IR band, leveraging existing US mid-wave IR imager systems while avoiding detection by adversaries with near-infrared imagers like night vision goggles, uncooled thermal imagers, etc. As a result, covert operations remain covert.

While the present invention has been particularly shown and described with references to configurations thereof, it will be understood by those skilled in the art that various changes in form and details may be made therein without departing from the spirit and scope of the invention as defined by the appended claims.

What is claimed is:

1. A device comprising:
   a housing;
   a light source disposed within the housing;
   a window defined by the housing and optically downstream of the light source;
   a sensor configured to receive a first beam of radiation from a remote radiation source that is located remotely with respect to the device; and
   a controller operably coupled to (i) the light source and (ii) the sensor, the controller configured to control the light source to emit a second beam of radiation based at least in part on receipt of the first beam of radiation from the remote radiation source by the sensor,
   wherein the window is a first window and the sensor is located external to the housing under a second window.

2. The device of claim 1, further comprising an optical system between the light source and the window, the optical system configured to one or more of direct or divert the second beam of radiation.

3. The device of claim 2, wherein the optical system comprises an engineered diffuser.

4. The device of claim 1, wherein the window comprises a divergent lens.

5. The device of claim 1, wherein the housing is thermally coupled to the light source to dissipate heat from the light source via at least a portion of the housing.

6. The device of claim 1, wherein the first beam of radiation and the second beam of radiation have a same wavelength.

7. The device of claim 1, wherein the second beam of radiation is an encoded beam of radiation, and wherein based at least in part on receipt of the encoded beam of radiation, the controller is configured to control the light source to emit the second beam of radiation in one of a plurality of modes of emission.

8. The device of claim 7, wherein the plurality of modes of emission comprises a single flash, a repetitive flash, and a patterned flash.

9. The device of claim 1, further comprising a port configured to receive power from an apparatus to which the device is attached.

10. A system comprising:
    a first device comprising:
      a first housing;
      a first light source disposed within the first housing;
      a window defined within the first housing and optically downstream of the first light source;
      a sensor configured to receive a first beam of radiation; and
      a controller operably coupled to (i) the first light source and (ii) the sensor, the controller configured to control the first light source to emit a second beam of radiation based at least in part on receipt of the first beam of radiation by the sensor,
    wherein the window is a first window and the sensor is located external to the first housing under a second window; and
    a second device located remotely from the first device comprising:
      a second housing;
      a second light source within the second housing and configured to emit the first beam of radiation; and
      a mounting component configured to attach the second light source to an apparatus external to the second housing.

11. The system of claim 10, further comprising an optical system between the first light source and the window, the optical system configured to one or more of direct or divert the second beam of radiation.

12. The system of claim 10, wherein the first housing is thermally coupled to the first light source to dissipate heat from the first light source via at least a portion of the first housing.

13. The system of claim 10, wherein the first beam of radiation and the second beam of radiation have a same wavelength.

14. The system of claim 10, wherein the second beam of radiation is an encoded beam of radiation, and wherein based at least in part on receipt of the encoded beam of radiation, the controller is configured to control the first light source to emit the second beam of radiation in one of a plurality of modes of emission.

15. The system of claim 14, wherein the plurality of modes of emission comprises a single flash, a repetitive flash, and a patterned flash.

16. The system of claim 10, wherein at least the first device further comprises a port configured to receive power from an apparatus to which the first device is attached.

\* \* \* \* \*